March 21, 1939.　　J. H. BUCHANAN　　2,151,499
DEXTROSE SOLUTION
Filed Feb. 13, 1937
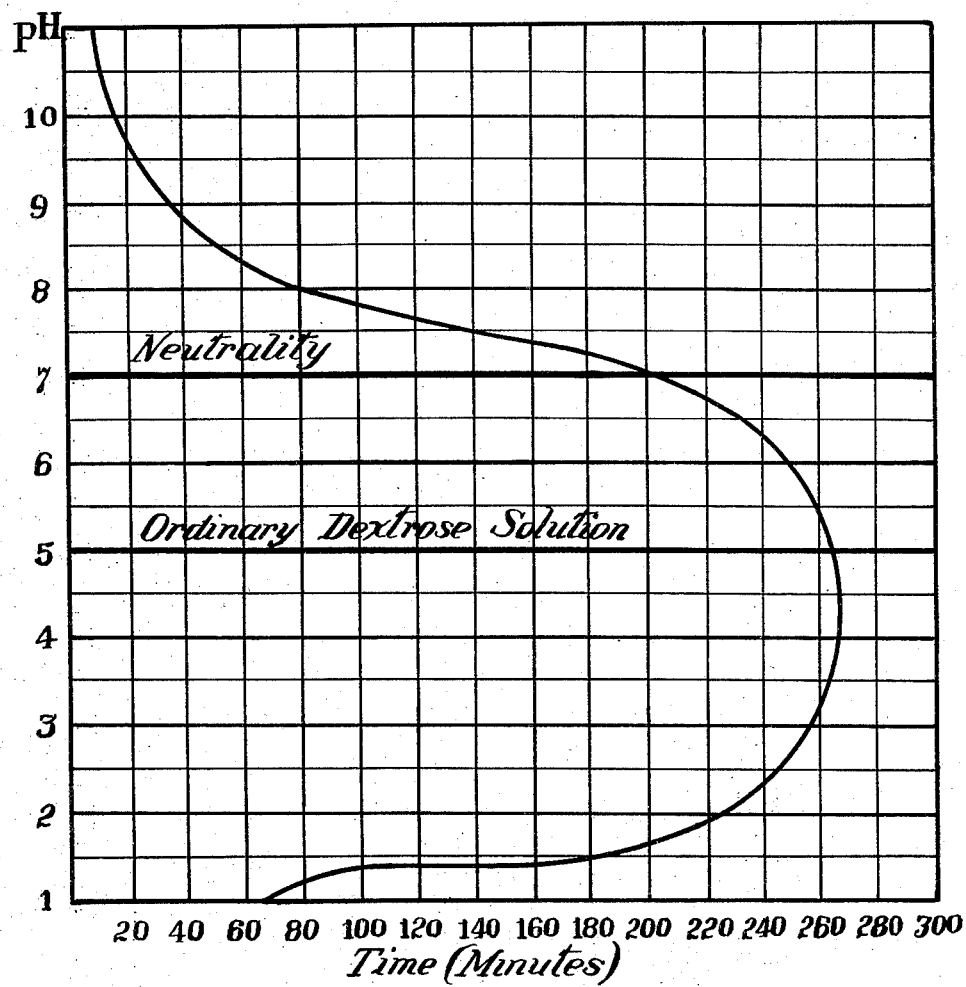
Inventor
John Hall Buchanan Patented Mar. 21, 1939

2,151,499

UNITED STATES PATENT OFFICE 2,151,499

DEXTROSE SOLUTION

John Hall Buchanan, Ames, Iowa, assignor, by mesne assignments, to Corn Products Refining Company, New York, N. Y., a corporation of New Jersey Application February 13, 1937, Serial No. 125,543

5 Claims. (Cl. 99—142)

This invention relates to processes involving the dissolving of dextrose in water, for example in the manufacture of soft drinks; and the object of the invention is to provide a method of shortening the time required for dissolving the dextrose which, in comparison with sucrose, for example, is slow to dissolve in water, particularly, if, as may happen in small plants, steam is not available for hastening the dissolving of the sugar.

The invention is based upon the discovery that the time required for dissolving dextrose in water may be very considerably shortened by adding to the water suitable alkaline substance. If the solution is to be used in the manufacture of edible or potable products such for example, as soft drinks flavored with organic acids, such as citric or malic acid, the alkaline substance should respond to the following requirements: it should give no precipitate when neutralized by the organic flavoring acid used; it should have in itself no bad taste; it should be of such character as not to react with the organic substances in the drink in such manner as to impair the flavor of the drink. It is known that strong alkalies have a destructive action on dextrose as well as on other sugars, which is enhanced by high temperatures and the prolongation of the time of contact. Since the object of the invention is not to impair the character of the sugar, the pH values are relatively low and the temperature and time of contact such as not to bring about any destructive reaction between the alkali and the dextrose. In order to be most effective for the purpose for which it is intended the alkaline substance should be capable, when used in such relatively small quantities as will comply with the other requirements, above stated, of raising the pH to some point in the neighborhood of 9 or 10.

For this purpose the following alkaline substances have been found suitable: the sodium and potassium carbonates and bicarbonates, caustic soda and potash, the alkali phosphates such as tri-sodium phosphate and sodium lactate. Other alkaline substances could be used.

The accompanying drawing is a diagram illustrating the rate of solution of dextrose in water over a pH range of 1 to 10+.

In practicing the invention in the manufacture of soft drinks, a so-called bottler's syrup is made having a density of approximately 32° Baumé (which, of course, may be varied as desired) and containing dextrose and preferably also sucrose, the latter for sweetening purposes, together with the selected alkaline substance. To this syrup is added an organic acid or acids and/or other flavoring substances together with water which latter may be carbonated. This may be done either at the bottling plant or at the soda fountain.

The base formula for the syrup may be as follows:

Sucrose (cane sugar)_____grams__ 593
Dextrose (anhydrous)_____do____ 593
Water_____cc__ 814

If hydrate dextrose is used in place of anhydrous, the amounts of dextrose and water should be adjusted in accordance with the water of hydration in the dextrose. The proportions of sugar may be varied to a considerable extent depending upon the degree of sweetness required. The density may be varied by varying the water content. The formula is, in fact, merely typical.

A solution of these ingredients will have a pH of about 4.8 to 5; and by referring to the diagram it will be seen that at this pH it will take about 260 minutes for dextrose to dissolve at a temperature of 70° F.

If to the water used for making the syrup according to the above formula is added 20 grams of sodium bicarbonate, the pH will be raised to about 8.4 and the time required for dissolving the solution reduced to about 80 minutes.

If there be added to the water 20 grams of sodium carbonate, the solution will be given a pH of about 9.6 and the dextrose will dissolve in about 20 minutes.

If 20 grams of tri-sodium phosphate is used as a promoting agent in dissolving the dextrose, the pH will be about 9.6 and the time required for dissolving the dextrose approximately 20 minutes.

If 4 to 5 grams of caustic soda is used, the pH will be close to 10 and the time required for dissolving the dextrose about 10 minutes.

Other alkaline substances can be used in place of those mentioned; the selection to be made in accordance with the requirements specified, at least so far as concerns the manufacture of potable beverages of the type described.

The invention, however, is not limited to the manufacture of soft drinks, but may be used to advantage whenever it is desired to hasten the dissolving of dextrose in water.

All modifications, therefore, of the above described process within the scope of the appended claims are intended to be covered.

I claim:

1. Method of making a dextrose containing syrup for use in the manufacture of flavored, potable liquids which comprises: dissolving the dextrose in water containing an alkaline substance which gives no precipitate when neutralized by acid flavoring substances, does not affect the flavor of the drink and raises the pH of the syrup to a point substantially above 7.

2. Method of making a dextrose containing syrup for use in the manufacture of flavored, potable liquids which comprises: dissolving the dextrose in water containing an alkaline substance selected from the class consisting of the sodium and potassium carbonates and bicarbonates, caustic soda and potash, the alkali phosphates and sodium lactate.

3. Method of making a dextrose containing syrup for use in the manufacture of potable liquids which comprises: dissolving the dextrose in water containing an alkaline substance selected from the class consisting of the sodium and potassium carbonates and bicarbonates, caustic soda and potash, the alkali phosphates and sodium lactate and which gives no precipitate when neutralized by acid flavoring substances, does not affect the flavor of the drink and raises the pH of the syrup to a point substantially above 7.

4. In the manufacture of soft drinks the process which comprises making a syrup by dissolving dextrose and sucrose in water containing an alkaline substance which raises the pH of the solution to a point substantially above 7.

5. In the manufacture of soft drinks the process which comprises making a syrup by dissolving in substantially the proportions to be specified: sucrose 593 grams and anhydrous dextrose 593 grams in water 814 cc. containing an alkaline selected from the class consisting of the following substances in the proportionate quantities as follows: sodium bicarbonate 20 grams, sodium carbonate 20 grams, tri-sodium phosphate 20 grams, caustic soda 4-5 grams.

JOHN HALL BUCHANAN.